(No Model.)

J. H. WIESTNER.
NUT LOCK.

No. 560,554. Patented May 19, 1896.

Witnesses:
Fred D. Goodwin
A. V. Groupe

Inventor:
John H. Wiestner
by his Attorneys
Howson & Howson

UNITED STATES PATENT OFFICE.

JOHN H. WIESTNER, OF PHILADELPHIA, PENNSYLVANIA.

NUT-LOCK.

SPECIFICATION forming part of Letters Patent No. 560,554, dated May 19, 1896.

Application filed March 8, 1892. Serial No. 424,204. (No model.)

*To all whom it may concern:*

Be it known that I, JOHN H. WIESTNER, a citizen of the United States, and a resident of Philadelphia, Pennsylvania, have invented certain Improvements in Nut-Locks, of which the following is a specification.

The object of my invention is to provide a cheap and simple form of nut-locking device which will effectively retain the nut or nuts after the latter have been tightened, but will permit of the backing off of the nut or nuts when sufficient force is applied thereto. This object I attain in the manner hereinafter set forth, reference being had to the accompanying drawings, in which—

Figure 1:
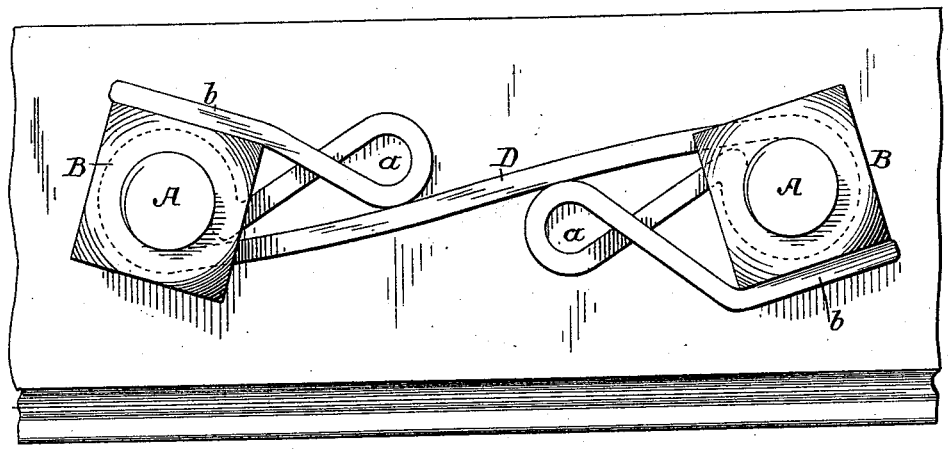
Figure 2:
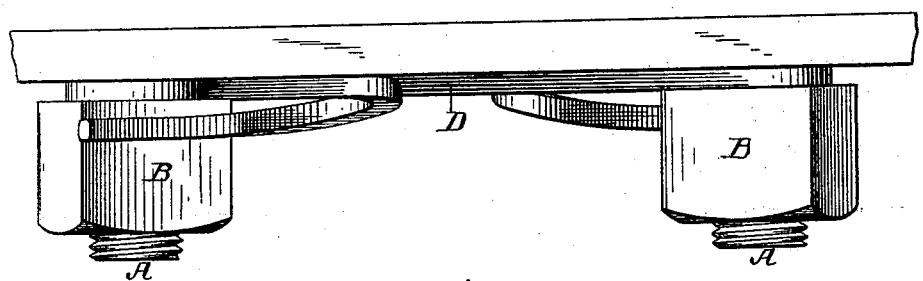
Figure 3:
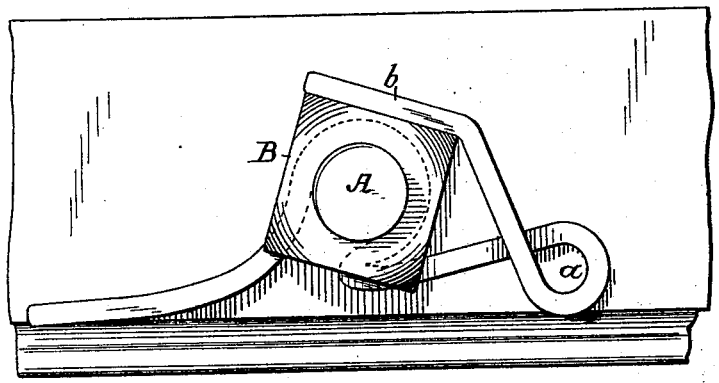

Figure 1 is a front view illustrating a duplex nut-lock constructed in accordance with my invention. Fig. 2 is a plan view of the same, and Fig. 3 is a front view of the device constructed for application to a single nut.

In Figs. 1 and 2, A A represent two bolts provided with the usual nuts B, and D is a bar of iron or steel extending from nut to nut and looped around the bolts between the nuts and the fish-plate or other surface against which the nuts would otherwise bear. Each end of the bar then has a reverse loop $a$ formed in it, so as to carry the end of the bar in the form of a spring-finger $b$ along one side of the nut, against which said spring-finger bears with a pressure directed toward the center of the bolt, so as to effectually prevent the accidental unscrewing of the nut. If sufficient force is applied to the nut, however—as, for instance, by means of a suitable wrench—the nut can be turned in either direction, so as to screw it up or unscrew it, the spring-finger $b$ yielding to permit the corners of the nut to pass beneath it, so that the finger does not have to be pressed out of the way by a special tool so as to clear the nut before the latter can be unscrewed.

In Figs. 1 and 2 I have shown the locking device in duplex form for application to a pair of nuts, but it will be evident that it can be constructed for application to a single nut as well, a suitable retainer being in this case employed to prevent the looped bar from swinging round the bolt. Such a retainer may—for instance, in the case of a rail-joint—be the base of the rail, as shown in Fig. 3, or there may be a suitable engaging projection on the fish-plate or other surface against which the bar is pressed by the nut.

It will be observed that when the bar is constructed in duplex form the spring retaining-fingers bear upon the top of one nut and upon the bottom of the other nut, so that when the nuts are turned to the right, in screwing them up, the pressure upon each finger will be exerted first at a point adjacent to the outer end of the finger, which is the point presenting the least resistance, whereas in unscrewing either nut the corner of the same acts upon the portion of the finger nearest to the loop $a$, where the resistance to its movement is greatest. It will also be observed that the bar is looped around the bolt in the direction in which the nut will be turned in order to screw it up, so that the pressure of the nut upon the looped portion of the locking-bar tends to tighten the loop rather than to spread the same, as it would if the bar was looped around the bolt in the opposite direction.

Having thus described my invention, I claim and desire to secure by Letters Patent—

1. The within-described nut-locking device consisting of a bar looped around the bolt beneath the nut, and having a second loop formed at a point beyond the nut, and a spring-finger projecting from said second loop and lying along one of the flat sides of the nut so as to press toward the bolt, said finger having no bearing except that upon the one side of the nut, so that it is free to yield when the nut is turned by force in either direction, substantially as specified.

2. The within-described duplex nut-locking device consisting of a bar looped at each end around a bolt beneath the nut, and then having, adjacent to said loop, a reverse loop at a point beyond the nut, said reverse loop terminating in a projecting spring-finger lying along one of the flat sides of the nut and pressing toward the bolt, said finger having no bearing except that upon the one side of the nut so that it is free to yield when the nut is turned by force in either direction, substantially as specified.

In testimony whereof I have signed my name to this specification in the presence of two subscribing witnesses.

JOHN H. WIESTNER.

Witnesses:
EUGENE ELTERICH,
HARRY SMITH.